March 15, 1927.
H. FORD
1,621,007
METHOD OF MAKING AXLE HOUSINGS
Filed July 6, 1925
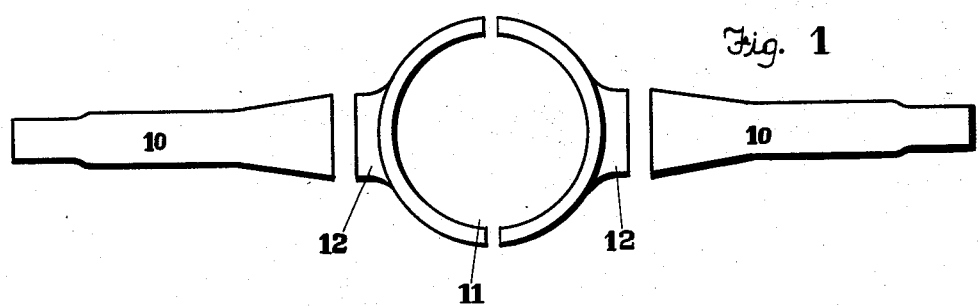
Fig. 1
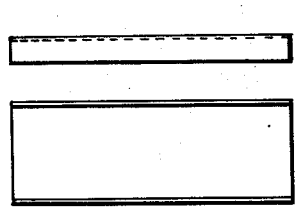
Fig. 4
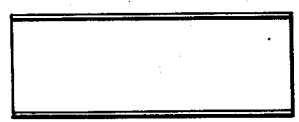
Fig. 5
Fig. 6
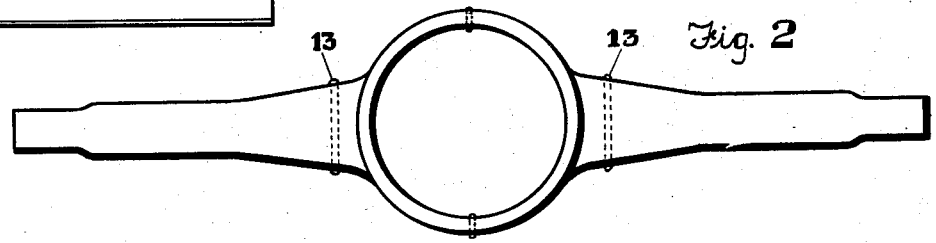
Fig. 2
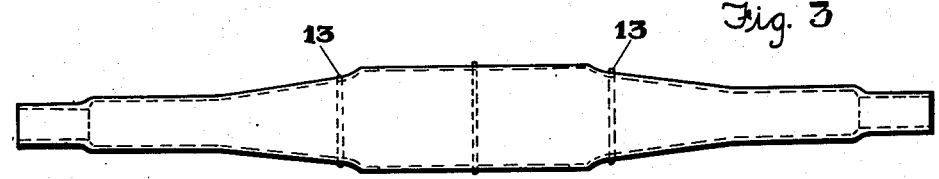
Fig. 3
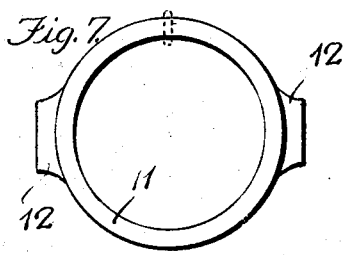
Fig. 7
WITNESS:
F.B. Marchialetto
INVENTOR.
Henry Ford.
BY
ATTORNEY.

Patented Mar. 15, 1927.

1,621,007

UNITED STATES PATENT OFFICE.

HENRY FORD, OF DEARBORN, MICHIGAN.

METHOD OF MAKING AXLE HOUSINGS.

Application filed July 6, 1925. Serial No. 41,530.

The object of my invention is to provide new and useful improvements in an axle housing, of simple, durable, and inexpensive construction.

A further object of my invention is to make an axle housing such as is used for the rear axle of automobiles, tractors and the like which may be readily constructed at a minimum cost and with a minimum amount of material.

A further object of my invention is to construct an axle housing of the type known as the "banjo" type, wherein the housing is constructed in sections and which are then welded together.

A further object of my invention is to construct such a housing from sections welded together wherein the central portion of the housing is formed from one or two pieces of material and the two end portions are formed from other pieces of material.

With these and other objects in view, my invention consists in the arrangement, combination, and construction of the various parts of my improved device, as described in the specification, claimed in my claims, and shown in the accompanying drawings, in which:

Figure 1 shows the sections of my improved axle housing ready to be welded.

Figure 2 shows an elevation of the completed housing wherein the parts have been welded together and the flashing from the weld trimmed.

Figure 3 shows a top or plan view of the housing shown in Figure 2, the shape of the hollow inside of the housing being indicated by the dotted lines.

Figures 4, 5 and 6 show respectively a side, plan and end view of the blanks from which the central portion of my improved axle housing is formed, and Figure 7 is an elevation of the central portion of the housing, illustrating an alternative method of forming same.

Referring to the accompanying drawings, I have used the reference numeral 10 to indicate the two end portions of the axle housing which are forged to substantially hollow cylindrical shape. The outer ends of these portions 10 are contracted somewhat and the inner ends are expanded somewhat. The central portion 11 of the axle housing is a ring of channel shaped cross-section having opposed registering openings around which are formed sleeves 12 which are designed to be welded as at 13 to the end portions 10. This central portion is preferably formed by cutting a strip of channel iron, such as is illustrated in Figures 4, 5, and 6, into sections of the proper length and then heating these sections and forging them to the shape shown in Figure 1 with the sleeves 12 formed therein. I have successfully made the central portion of the axle, both by forming it in two parts and then butt-welding the ends of the two parts together, and by forming it from a single strip which is forged to form a ring and then the ends welded together as is illustrated in Figure 7.

I am aware that it has heretofore been proposed to form such an axle by blanking sheet stock and then forming the blanks to form a half of the axle housing such as would be formed by dividing the housing on a central horizontal or vertical line. Where such an axle housing is formed, difficulty is encountered in thickening the metal of the blank to strengthen weak portions of the axle housing and further difficulty is encountered in welding the sections of such an axle together, as will be obvious from the length and area of the surface which would have to be welded where the axle housing is so divided. It has even been proposed and certain automobiles have used an axle housing formed from a solid billet of material which has the inside thereof machined thereout to form the necessary recesses within the housing.

With my improved housing, it is relatively easy to form the dies and the end portions 10. When these end portions 10 are formed it will be understood that the process is similar to that which has been used for a number of years for making seamless steel tubing and these members may be formed relatively cheaply due to their shape. The central portion 11 is also formed relatively easily, and the dies for forming same are very inexpensive as compared with those which would be required if the entire housing were to be forged from a single piece.

Among the many advantages arising from the use of my improved axle housing it will be apparent that it may readily be made to have all the strength of a housing formed from a unitary piece of material and perhaps of even greater strength. The cost of this housing is very much lower than that of any other method of forming such a housing with which I am familiar, as the welding operation is relatively simple and the operations and dies for forming the portions are also relatively simple.

I claim as my invention:

1. The method of forming an axle housing of the banjo type consisting of forming substantially hollow cylindrical end portions, forming a central portion of generally ring shape and of channel cross section and provided with opposed registering hollow tubular extensions, and then welding the end portions to such tubular extensions.

2. The method of forming an axle housing of the banjo type consisting of shaping a central portion of channel cross section to generally ring shape and then welding to form a complete ring, forming registering hollow tubular extensions on said ring, forming substantially cylindrical hollow end portions and then butt welding said end portions to the extensions of the central portion to form an integral housing structure.

HENRY FORD.